Patented May 21, 1940

2,201,172

UNITED STATES PATENT OFFICE

2,201,172

POLYMERIC CARBOTHIONAMIDES AND PROCESS FOR PREPARING THE SAME

William Edward Hanford, Wilmington, Del., assignor to E. I. du Pont de Nemours & Company, Wilmington, Del., a corporation of Delaware No Drawing. Application September 15, 1938, Serial No. 230,143

9 Claims. (Cl. 260—551)

This invention relates to polymeric organic materials and more particularly to polymeric carbothionamides. The present application is a continuation-in-part of my co-pending application Serial Number 137,149, filed April 15, 1937.

This invention has as an object the preparation of new polymeric products. A further object is the preparation of polymeric materials useful for the manufacture of filaments, films, coating compositions, plastics, and the like. A further object is the preparation of polymeric carboxylic acid amides in which amido oxygen is replaced by sulfur. Other objects will be apparent from the ensuing description.

Broadly speaking, the above objects are accomplished by reacting under polymerization conditions certain bifunctional compounds having mutually reactive carbothionamide-forming groups. More specifically, the objects of the invention are accomplished by reacting together ingredients comprising at least two molecules of at least one compound having two and only two carbothionamide functions, said functions, when both are nitrile, being separated by a chain of at least three contiguous carbon atoms, and when comprising primary amino by a chain of at least two contiguous carbon atoms, said compound or compounds being so chosen that the carbothionamide functions in at least one of them comprise at least one primary aliphatic amino group, being further so chosen that there is present an equal number of complementary carbothionamide functions, and being further so chosen that the structural unit formed will have a chain length of at least seven. Still more specifically, the objects of the invention are accomplished in one way by reacting hydrogen sulfide with at least two molecules of at least one compound containing two and only two carbothionamide functions selected from the class consisting of nitrile and primary aliphatic amino, said functions when both are nitrile being separated by a chain of at least three contiguous carbon atoms and when comprising primary aliphatic amino by a chain of at least two contiguous carbon atoms, said compound or compounds being further so selected that there is present an equal number of nitrile and primary aliphatic amino groups, and being further so selected that the structural unit formed will have a chain length of at least seven. The reaction, in order to obtain useful fiber-forming products, is preferably continued until a product having an intrinsic viscosity, as defined below, of at least 0.2 is obtained.

By the term "carbothionic acid" is meant an acid having a

group, and, by the expression "amide of a carbothionic acid" (or more briefly "carbothionamide"), a thioamide having the structure

By "secondary carbothionamide" is meant a thioamide having one, and only one, hydrogen attached to the thioamido nitrogen.

By "primary aliphatic amino" is meant a primary amine in which all amino nitrogen atoms are attached to aliphatic carbon atoms, i. e., carbon atoms which are not a part of an aromatic ring.

By "carbothionamide function" is meant carbothionamide-forming group, i. e., a functional group, such as nitrile, primary aliphatic amino, and isothiocyanate, which will react with another compound or compounds to form the carbothionamide structure.

The term "complementary," as applied to carbothionamide functions, is used to mean a function of type "opposite" to that of the function with which it is complementary in that the two are both required for producing the carbothionamide. Thus, primary aliphatic amino and isothiocyanate are complementary, as are primary aliphatic amino and nitrile, in the presence of hydrogen sulfide.

By the word "contiguous" is meant that the chain carbon atoms referred to are all in the chain of atoms of which the functional groups are a part.

By "structural unit" is meant that chemical unit of structure which repeats itself or recurs in the polymer; it might be called the "least common divisor" of the polymer, and is readily determinable by a simple inspection of the formulas of the reactants. Similarly "unit length" refers to the number of atoms present in the longest chain which includes the terminal atoms of the structural unit, and "radical length," a term which will be applied to the various reactants, indicates the number of atoms present in the chain of that part of the molecule which becomes all or a part of the structural unit. To illustrate, adiponitrile, of the formula

NC—CH₂—CH₂—CH₂—CH₂—CN and of radical length six, reacts with hydrogen sulfide and ethylenediamine, of the formula

H₂N—CH₂—CH₂—NH₂ and of radical length four, to eliminate two molecules of ammonia (the ammonia nitrogen being originally the nitrile nitrogen) and to give a polymeric carbothionamide having a structural unit

of unit length ten. The radical length, then, of a dinitrile will be the number of carbon atoms in the chain, including the nitrile carbons; that of a monoaminomononitrile will be the total number of chain atoms, including the amino nitrogen but excluding the nitrile nitrogen; that of a diisothiocyanate will be the total number of chain atoms, exclusive of the two isothiocyanate sulfur atoms; and that of the primary aliphatic diamine will be the total number of chain atoms between and including the amino nitrogens, regardless of the compound with which it is reacted.

By "intrinsic viscosity," as applied to the polymers of certain of the examples, is meant the mathematical quotient $$\frac{\log e \, Nr}{C}$$

where $Nr$ is the viscosity of a dilute (e. g., 0.5%) solution of the polymer in a suitable solvent (e. g., m-cresol) at a convenient temperature (e. g., 25° C.) divided by the viscosity of the same solvent in the same units at the same temperature, and $C$ is the concentration in grams of polymer per 100 cc. of solution.

The products of the present invention, regardless of their method of preparation, are generically designated as linear polymeric secondary amides of either carbothionic (—CSOH) or carbodithioic (—CSSH) acids. For convenience and simplicity, they have been and will be discussed only as amides of carbothionic acids. Such products are always obtained if the reactants are chosen as indicated above. However, depending upon the classes of reactants selected, the products fall into two well-defined groups: (A) polymeric amides of dibasic carbothionic acids and diprimary diamines, and (B) polymeric amides of primary monoaminomonocarbothionic acids. Type (A) may be further subdivided into (a) polymeric amides of thiocarbonic acid (i. e., polythiocarbamides or polythioureas), which are obtainable from one or more diprimary diamines and one or more diisothiocyanates, and (b) polymeric amides of dicarbothionic acids, which are obtainable from one or more dinitriles, hydrogen sulfide, and one or more diprimary diamines. Type (B) is obtainable from hydrogen sulfide and one or more primary monoaminomononitriles. The reactions by which these several types are formed may be represented generally as follows. The various R's represent divalent radicals of appropriate chain lengths, and the $x$'s the number of participating molecules:

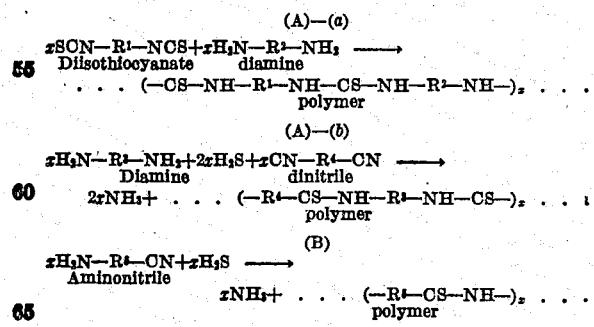

It is to be noted that in type (B) above, the two molecules having two carbothionamide functions are molecules of the same compound. In such a case, of course, the functions must be complementary. By definition one of them must be primary aliphatic amine. The other therefore may be nitrile (illustrated), in which case hydrogen sulfide is required as an additional reactant, or it may be isothiocyanate, in which case no additional reactant is needed.

As already indicated, in order that linear polymeric products be obtained, the reactants must be so chosen that the structural unit which will be formed will have a unit length of at least seven and preferably of at least eight. This unit length is determinable from the radical lengths of the reactants, which in turn can be readily ascertained by an inspection of their formulas as hereinbefore explained. Even when the length of the structural unit is seven, some cyclization takes place; therefore best yields of polymers are obtained when compounds are used whose sole or joint radical lengths, as the case may be, are at least one higher than the minimum.

It is further to be noted that the functional groups, when both are nitrile groups, should be separated by a chain of at least three contiguous carbon atoms, and when one is a primary aliphatic amino group or both are primary aliphatic amino groups, by a chain of at least two contiguous carbon atoms. This is due in part to the fact that compounds not so qualified are unknown or in some way unsuitable. This requirement will automatically cause the diamine-dinitrile and diamine-diisothiocyanate products to have structural units of length greater than seven. Similarly, it will be seen that, in the case of aminonitriles, the requirement is itself taken care of by the limitation on minimum unit length of the structural unit.

Products of group (A), subgroup (b) are made in general as follows: Exact chemical equivalents of diamine and dinitrile are mixed in a suitable vessel, and to this mixture is added a diluent such as phenol which is a solvent for the product and chemically inert, under reaction conditions, to reactants and product. Gaseous hydrogen sulfide is then passed in at 100–200° C. under such conditions that ammonia and excess hydrogen sulfide may escape without substantial loss of diamine or dinitrile. This is continued until substantially no more ammonia is evolved. The polymer may then be isolated from the viscous solution which has formed by removing the solvent in vacuo or by pouring the solution into a liquid such as ether which dissolves the solvent but not the polymer.

The products of group B are made in general in the same way, i. e., the aminonitrile is placed in contact with an appropriate inert solvent for the product, and hydrogen sulfide passed in at elevated temperature until evolution of ammonia has substantially ceased. The polymer is then isolated by distilling off the solvent or by adding the solution to a liquid which dissolves the solvent but not the polymer.

Products of group (A), subgroup (a), i. e., polymeric amides of thiocarbonic acid or polythioureas, are a species coming within the scope of my generic invention, but are specifically the invention of Paul L. Salzberg and myself and are claimed by us in our copending application Serial Number 230,145, filed of even date herewith. Reference is made to our joint application for a general description of the preparation of polythioureas.

The more detailed practice of the invention is illustrated by the following examples, wherein parts given are by weight. Examples I–VI inclusive illustrate group (A), subgroup (b) above; Examples VII–IX inclusive illustrate group (B); and Example X illustrates group (A), subgroup (a). The invention of course has many other specific embodiments.

Example I

Polymeric ethylenethioadipamide

Adiponitrile (21.6 parts, 0.2 mol) and ethylenediamine (12.0 parts, 0.2 mol) in phenol (50 parts) are heated five hours at 100° C. and thirty minutes at 130° C., while hydrogen sulfide is bubbled through the solution. The phenol is removed by distillation under diminished pressure, the bath temperature being increased to 180° C. The polymeric product obtained may be formed into films when flowed from organic solvents and baked 18 hours at 100° C.

Example II

Polymeric decamethylenethiosebacamide

Sebaconitrile (32.8 parts, 0.2 mol) and decamethylenediamine (34.4 parts, 0.2 mol) in phenol (120 parts) are heated five hours at 100–120° C. while hydrogen sulfide is bubbled through. An additional 250–300 parts of phenol is added, the solution warmed until uniform, and poured into ether. The polymeric product separates as a cream-colored gum from which volatile products may be steam distilled. The residue is dried under 26 inches of vacuum at 110° C. for 18 hours. The polymer thus obtained softens at 45–50° C., is dark brown in color, and is very rubbery.

Example III

Polymeric decamethylenethiosebacamide

Sebaconitrile (16.4 parts, 0.1 mol) and decamethylenediamine (17.2 parts, 0.1 mol) are dissolved in dioxan (50 parts) and heated seven hours at 90–100° C., during which time hydrogen sulfide is bubbled through the solution. The dioxan is removed under diminished pressure, leaving a solid yellow polymeric product which softens at 85–90° C. Films cast from pyridine or dioxan solutions of this polymer and baked 18 hours at 100° C. are clear and tough.

Example IV

Polymeric hexamethylenethioadipamide

Hexamethylenediamine (11 parts, 0.095 mol) is dissolved in 50 parts of dioxan, and adiponitrile (10.25 parts, 0.095 mol) is added, followed by 260 parts of dioxan. This solution is heated at 90–100° C. for nine hours while hydrogen sulfide is passed through. The polymer obtained from the solution is soluble in hot dioxan and hot β-ethoxyethanol, partly soluble in hot alcohol, and insoluble in toluene.

Example V

Polymeric decamethylenethioterephthalamide

Decamethylenediamine (18.0 parts, 0.105 mol) and p-dicyanobenzene (12.8 parts, 0.1 mol) are heated in 135 parts of butoxyethanol for two hours at 140° C., during which time much sublimation occurs. The heating is continued for eight hours at 90–100° C., hydrogen sulfide being passed through during both periods of heating. After the solution has stood for 18 hours, a solid polymeric product precipitates and is filtered and washed with ethanol. It consists of 23 parts of a light yellow powder, insoluble in hot alcohol and toluene. This polymer decomposes slowly at 175° C. and melts completely at 190° C.

Example VI

Polymeric decamethylenethiosebacamide

In a pressure vessel are placed 16.4 parts of sebaconitrile, 17.2 parts of decamethylenediamine, and 80 parts of absolute ethyl alcohol. This mixture is saturated with hydrogen sulfide at room temperature, causing separation of a white salt. The pressure vessel is now sealed, heated for 8 hours at 100° C., and then opened. On evaporating out the alcohol, a very light yellow polymeric solid is obtained which is insoluble or very slightly soluble in acetone, alcohol, benzene, dioxane, ethyl acetate, ethyl alcohol, and carbon tetrachloride. It is, however, sparingly soluble in pyridine.

Example VII

Self-polymer of ω-aminothiocapric acid preparation with toluene as solvent

Twenty-eight (28) parts of ω-aminocaprinitrile ($H_2N(CH_2)_9CN$) is added to an excess of liquid hydrogen sulfide in 22 parts of dry toluene at −70° C. to −80° C. A white salt-like material begins to separate immediately. After all of the aminonitrile has been added, the resulting toluene slurry is transferred to a steel bomb at room temperature, which is then sealed and heated for twelve hours at 150° C. When the bomb is cooled and opened, a yellow crumbly product is found to have separated from the toluene solution. This polymer, after filtration to remove toluene, softens at 65° C. and melts at 110° C. When fused, it can be drawn into short filaments. This polymer is soluble in pyridine, phenol, and benzyl alcohol, is slightly soluble in β-methoxyethanol, and is insoluble in methanol, absolute ethanol, and dioxan. Its neutralization equivalent, as determined by titration with m-cresolsulfonic acid, in m-cresol solution using m-Cresol Purple as indicator, is 1900.

To effect further polymerization of the above relatively low polymer, it is heated at 110° C. to 120° C. in an atmosphere of hydrogen sulfide for one and one-half hours and then for an additional hour at 180° C. It is then dark and resinous, softens at 65° C., melts at 120° C., is soluble in hot phenol and hot ethylene chlorohydrin, partly soluble in hot diethylene glycol and hot cyclohexanone and insoluble in ethylene glycol, butanol, dioxan, and cyclohexanol. When molten it may be drawn into filaments by touching with a cold rod and withdrawing the rod. These filaments show a permanent deformation when cold drawn and form crinkly filaments when the tension is released. The intrinsic viscosity of the polymer, determined in m-cresol, is 0.21, and the neutralization equivalent, as determined by titration with m-cresolsulfonic acid, in m-cresol solution using m-Cresol Purple as indicator, is 1660.

Example VIII

Self-polymer of ω-aminothiocapric acid preparation with a phenolic solvent

Fifty (50) parts of ω-aminocaprinitrile is placed in a steel bomb with 90 parts of crystalline phenol. Hydrogen sulfide is admitted at 250 lbs./sq. in. pressure; the bomb is sealed; and the mixture is heated for twelve hours at 150° C. After cooling and opening, a solution which is liquid at room temperature is found to be present. This solution is added to 110 parts of melted phenol and the mixture poured into 640 parts of well-stirred alcohol. A rubbery mass separates. The neutralization equivalent of the polymer, as determined by titration with m-cresolsulfonic acid, in m-cresol solution using m-Cresol Purple as indicator, is 2200.

EXAMPLE IX

*Self-polymer of ω-aminothiocapric acid preparation without solvent*

Thirty (30) parts of ω-aminocaprinitrile is placed in a steel bomb, and hydrogen sulfide under 250 lbs./sq. in. pressure is admitted for one hour with occasional shaking. The bomb is then sealed and heated for twelve hours at 150° C. Upon cooling and opening, a sticky gum which crystallizes within two hours is found to be present. It is soluble in hot β-ethoxyethanol, partly soluble in hot ethylene glycol and insoluble in ethanol, dioxan and chloroform. The polymer is dissolved in 90 parts of β-ethoxyethanol and reprecipitated by adding this solution to 80 parts of well-stirred ethanol. The tan-colored powder so obtained, after drying in the air, melts at 105° C. This polymer can be melt spun into filaments. Its neutralization equivalent, as determined by titration with m-cresolsulfonic acid, in m-cresol solution using m-Cresol Purple as indicator, is 1660.

EXAMPLE X

*Polymeric decamethylene thiourea*

To 7.95 parts of decamethylene diisothiocyanate in 140 parts of ether is added 5.34 parts of decamethylenediamine in 59 parts of ether. The white precipitate which separates after a short time is filtered off and washed with ether, 12 parts being obtained. It is insoluble in alcohol, soluble in m-cresol, melts at 115° C., and is presumably a low polymer. To effect further polymerization, it is dissolved in 15 parts of cresol and heated eight hours at 200° C., during which time some hydrogen sulfide is evolved. The cresol solution is washed with alcohol, giving a product which still melts at 115° C. and which has an intrinsic viscosity of 0.31. When fused, the polymer can be drawn to an elastic filament by touching with a cold rod and removing the rod. The polymer is insoluble in dilute sodium hydroxide, dilute hydrochloric acid, and glacial acetic acid.

In the subgeneric form of the invention illustrated in Examples I to VI, I may employ any diamine in which both amine groups are primary, attached to aliphatic carbons, and separated by a chain of at least two carbons contiguous therewith. Similarly, I may use any dinitrile in which the nitrile groups are separated by a chain of at least three atoms contiguous therewith. These minimum chain lengths of nitrile and amine automatically take care of the requirement, hereinbefore mentioned, that the reactants be so selected as to yield a product having a structural unit of length at least seven. Suitable specific amines include: hexamethylenediamine, decamethylenediamine, γ,γ'-bisaminopropyl ether, tetramethylenediamine, pentamethylenediamine, dodecamethylenediamine, 3-methylhexamethylenediamine, ethylenediamine, trimethylenediamine, propylenediamine, 1,4-diaminocyclohexane, p-xylylenediamine, octadecamethylenediamine, β,β'-diaminodiethyl ether, β,β'-diaminodiethyl sulfide, 1,6-dimethylhexamethylenediamine, 1,6-diphenylhexamethylenediamine, and 1,12-diaminooctadecane. Suitable specific dinitriles include those of the following acids: adipic, sebacic, suberic, azelaic, α-methyladipic, dilactylic, diglycolic, diphenic, p,p'-benzophenonedicarboxylic, quinolinic, thiodiglycolic, terephthalic, naphthalic, glutaric, α,α'-dimethyladipic, isophthalic, β-tert-amyladipic, 1,4-naphthalenedicarboxylic, γ,γ'-thiodibutyric, γ,γ'-sulfonedibutyric, β-cyclohexyladipic, and pinic. Dinitriles in which the nitrile groups are separated by only two contiguous carbons, such as o-phthalonitrile and maleonitrile, are not suitable for preparing polymeric carbothionamides since they react with hydrogen sulfide and diprimary diamines to form monomeric imidothioimides.

In the subgeneric form of the invention illustrated in Examples VII—IX, I may use any primary aliphatic monoaminomononitrile having a radical length of at least seven. Suitable specific nitriles include those of the following acids: ω-aminononanoic, ω-aminoundecanoic, ω-aminoheptadecanoic, 12-aminooctadecanoic, p-aminomethylbenzoic, p-aminomethylhydrocinnamic, 10-aminodecanoic, 2-methyl-6-aminohexoic, 6-methyl-6-aminohexoic, γ-amino-γ'-carboxydipropyl ether, and the like.

Reference is made to my joint application, Serial Number 230,145 for other specific diisothiocyanates and diamines which may be used in that form of the invention illustrated in Example X, and for other types of reactants that combine to form polythioureas.

In that embodiment of the invention illustrated by Examples I–IX, I may use as inert solvents, phenol, the cresols, o-hydroxydiphenyl, n-butanol, dioxan, β-methoxyethanol, methanol, the xylenoils, di-n-butyl ether, and the dimethyl ether of ethylene glycol. Temperatures may range from 75 to 300° C., but should preferably be from 100-200° C. Pressures may vary from 1 to 100 or more atmospheres. The hydrogen sulfide is preferably passed through the reaction mixture for the duration of the reaction, but, if the process is operated on a small scale, the other reactants may simply be dissolved in a solvent, the solution saturated at 0-25° C. with hydrogen sulfide, and the saturated solution heated in a closed system. The amount of hydrogen sulfide may be one mol or more per nitrile group. In general it is best to use a large excess of hydrogen sulfide and recover the unreacted portion. The proportions of diamine and dinitriles (Examples I–VI) should be very nearly chemically equivalent in order to obtain high molecular weight polymers. By changing the ratio markedly in either direction, lower molecular weight products are secured.

Reference is made to my joint application, Serial Number 230,145 for other conditions for carrying out that form of the invention illustrated in Example X.

The preferred process of the invention comprises the reacting of the primary aliphatic amine group with the nitrile group and hydrogen sulfide. As already explained, this amine group may be in the same molecule as the nitrile group, or it may be in a molecule with another primary amine group, in which case the nitrile group is also in a molecule containing another nitrile group.

The preferred compounds are amides of diamines of the formula H₂N—R—NH₂ and dicarbothionic acids of the formula

HO—CS—R'—CS—OH (or of dicarbodithioic acids of the formula HS—CS—R'—CS—SH). R is a divalent hydrocarbon radical having at least two carbons in the chain of which the amino nitrogens are a part, the carbons adjacent to R being aliphatic in character. R' is a divalent hydrocarbon radical having at least three carbons in the chain (or shortest chain) of which the nitrile groups are a part. A still more select group of thioamides are those of polymethylenediamines in which both amine groups are primary and polymethylenediamines in which both amine groups are primary and polymethylene dicarbothionic acids. Specifically R may be tetramethylene, pentamethylene, hexamethylene, decamethylene, α-methylhexamethylene, β-methylhexamethylene, α,α'-dimethylhexamethylene, α,α'-diphenylhexamethylene, α-octyldodecamethylene, ethylene, propylene, p-xylylene, 1,4-cyclohexylene, and the like. Specifically, R' may be any of the radicals just given for R or it may be an arylene radical such as p-phenylene, m-phenylene, 2,4-tolylene, 1,4-naphthylene, p,p'-diphenyl, and the like. Among the specific thioamides thus included are polymeric decamethylenethiosebacamide, ethylenethioadipamide, hexamethylenethioadipamide, decamethylenethioterephthalamide, decamethylenethioisophthalamide, p-xylylenethiopimelamide, propylenethio-(β-methyl)-adipamide, tetramethylenethio(t-amyl)adipamide, α-octyldodecamethylenethio(α,α'-dimethyl)adipamide, hexamethylenethiosuberamide, hexamethylenethioazelamide, dodecamethylenethiodiphenamide, and hexadecamethylenethio-1,4-naphthalamide.

The products of the present invention are useful for the preparation of filaments, fibers, films, coating compositions, and plastics.

The above description and examples are intended to be illustrative only. Any modification of or variation therefrom which conforms to the spirit of the invention is intended to be included within the scope of the claims.

I claim:

1. A linear polymeric carbothionamide.

2. A linear polymeric secondary amide of a carbothionic acid.

3. A linear polymeric secondary amide of a carbothionic acid capable of being drawn into a fiber.

4. A polymeric amide of a bifunctional carbothionic acid and a bifunctional primary amine, the primary amino groups of which are bound to aliphatic carbon atoms, which amine may be the same compound as the carbothionic acid, the functional groups of said bifunctional compound or compounds being separated by a chain of at least three contiguous carbon atoms, when both are nitrile groups, and by a chain of at least two contiguous carbon atoms otherwise, said amide having a unit length of at least seven.

5. A polymeric amide of a dicarbothionic acid and a diamine in which both amino groups are primary and attached to aliphatic carbon atoms, the acid groups of said acid being separated by a chain of at least three contiguous carbon atoms, and the amine groups of said amine by a chain of at least two contiguous carbon atoms.

6. Process of preparing polymeric carbothionamides which comprises reacting together ingredients comprising at least one compound having two and only two carbothionamide functions, said functions when both are nitrile being separated by a chain of at least three and otherwise by a chain of at least two contiguous carbon atoms, said compound or compounds being so chosen that the carbothionamide functions in at least one of them comprise at least one primary aliphatic amino group, so chosen that there is present an equal number of complementary carbothionamide functions, and so chosen that the structural unit formed will have a chain length of at least seven.

7. Process for preparing polymeric carbothionamides which comprises reacting together ingredients comprising at least one compound having two and only two carbothionamide functions, said functions when both are nitrile being separated by a chain of at least three and otherwise by a chain of at least two contiguous carbon atoms, said compound or compounds being so chosen that the carbothionamide functions in at least one of them comprise at least one primary aliphatic amino group, so chosen that there is present an equal number of complementary carbothionamide functions, and so chosen that the structural unit formed will have a chain length of at least seven and continuing the reaction until the product has an intrinsic viscosity of at least 0.2.

8. Process for preparing polymeric carbothionamides which comprises reacting hydrogen sulfide with at least two molecules of at least one compound containing two and only two carbothionamide functions selected from the class consisting of nitrile and primary aliphatic amino, said functions when both are nitrile being separated by a chain of at least three and otherwise by a chain of at least two contiguous carbon atoms, said compound or compounds being further so selected that there is present an equal number of nitrile and primary aliphatic amine groups, and further so selected that the structural unit formed will have a chain length of at least seven.

9. Process which comprises reacting hydrogen sulfide with a diamine in which both amino groups are primary, attached to aliphatic carbon atoms, and separated by a chain of at least two contiguous carbon atoms, and a dinitrile in which the nitrile groups are separated by a chain of at least three contiguous carbon atoms.

WILLIAM EDWARD HANFORD.